United States Patent
Vikberg et al.

(10) Patent No.: US 9,775,073 B2
(45) Date of Patent: Sep. 26, 2017

(54) GATEWAY CONFIGURED TO PROVIDE A HANDOVER, CONVERTING AND ROUTING FUNCTION

(75) Inventors: Jari Vikberg, Järna (SE); Thomas Lindqvist, Mölndal (SE); Tomas Nylander, Värmdö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1832 days.

(21) Appl. No.: 13/129,749

(22) PCT Filed: May 25, 2009

(86) PCT No.: PCT/SE2009/050592
§ 371 (c)(1),
(2), (4) Date: May 17, 2011

(87) PCT Pub. No.: WO2010/059100
PCT Pub. Date: May 27, 2010

(65) Prior Publication Data
US 2011/0286429 A1    Nov. 24, 2011

Related U.S. Application Data

(60) Provisional application No. 61/116,758, filed on Nov. 21, 2008.

(51) Int. Cl.
*H04W 36/00* (2009.01)
*H04W 36/08* (2009.01)
(Continued)

(52) U.S. Cl.
CPC ........ *H04W 36/0005* (2013.01); *H04W 36/08* (2013.01); *H04W 36/10* (2013.01);
(Continued)

(58) Field of Classification Search
None
See application file for complete search history.

(56) References Cited

U.S. PATENT DOCUMENTS 8,538,337 B2 * 9/2013 Damnjanovic .............. 455/63.1
2005/0141450 A1    6/2005 Carlton et al.
(Continued)

OTHER PUBLICATIONS

International Preliminary Report on Patentability, PCT International Application No. PCT/SE2009/050592, May 24, 2011 (1 pages).
(Continued)

*Primary Examiner* — Duc Duong
(74) *Attorney, Agent, or Firm* — Myers Bigel, PA

(57) ABSTRACT

In one aspect, the invention provides an improved procedure for handing over a connection from a source network node to a target network node. In some embodiments, this procedure includes the following steps: (a) receiving, at a gateway, a handover required message transmitted from the source network node; (b) generating, at the gateway, a handover request message in response to receiving the handover required message; and (c) transmitting, from the gateway, the handover request message to the target network node. In another aspect, the invention provides an improved gateway that is configured to intercept and handle handover signaling.

25 Claims, 7 Drawing Sheets

(51) Int. Cl.
*H04W 36/10* (2009.01)
*H04W 84/04* (2009.01)
*H04W 88/12* (2009.01)
*H04W 92/04* (2009.01)
*H04W 92/20* (2009.01)

(52) U.S. Cl.
CPC .......... *H04W 84/045* (2013.01); *H04W 88/12* (2013.01); *H04W 92/045* (2013.01); *H04W 92/20* (2013.01)

(56) References Cited

U.S. PATENT DOCUMENTS

| | | | |
|---|---|---|---|
| 2007/0021120 A1* | 1/2007 | Flore et al. | 455/436 |
| 2008/0025263 A1* | 1/2008 | Pelkonen | 370/332 |
| 2009/0156213 A1* | 6/2009 | Spinelli et al. | 455/436 |
| 2010/0029278 A1* | 2/2010 | Fang et al. | 455/436 |
| 2010/0046476 A1* | 2/2010 | Qiu | 370/331 |
| 2011/0194535 A1* | 8/2011 | Johansson et al. | 370/331 |
| 2011/0237258 A1* | 9/2011 | Nylander et al. | 455/437 |
| 2012/0244830 A1* | 9/2012 | Bao et al. | 455/404.1 |
| 2012/0244862 A1* | 9/2012 | Ramankutty et al. | 455/435.1 |
| 2012/0329460 A1* | 12/2012 | Huang et al. | 455/436 |

OTHER PUBLICATIONS

Written Opinion of the International Searching Authority, PCT Application No. PCT/SE2009/050592, Oct. 15, 2009 (8 pages).
International Search Report, PCT Application No. PCT/SE2009/050592, Oct. 15, 2009 (3 pages).
Eutran Proxy in Support of Massive Deployment of HNBs, Mitsubishi Electric, 3GPP TSG RAN WG3 Meeting #59, R3-080062, Sorrento, Italy, Feb. 11-15, 2008; pp. 1-6.
3$^{rd}$ Generation Partnership Project; Technical Specification Group Radio Access Network; Home (e)NodeB; Network Aspects (Release 8), 3GPP TR R3.020, V0.9.1 (Nov. 2008), Technical Report, pp. 1-68.
Impact on S1AP from HeNB GW Concept, Nokia Siemens Networks, Mitsubishi Electric, 3GPP TSG RAN WG3 Meeting #59, R3-080465, Sorrento Italy, Feb. 11-15, 2008, 5 pages.

* cited by examiner

GATEWAY CONFIGURED TO PROVIDE A HANDOVER, CONVERTING AND ROUTING FUNCTION

CROSS-REFERENCE TO RELATED APPLICATIONS

This application is a 35 U.S.C. §371 national stage application of PCT International Application No. PCT/SE2009/050592, filed on May 25, 2009, which claims priority from U.S. Provisional Patent Application No. 61/116,758, filed on Nov. 21, 2008, the disclosures and contents of which are incorporated by reference herein in their entireties. The above-referenced PCT International Application was published in the English language as International Publication No. WO 2010/059100 on May 27, 2010.

TECHNICAL FIELD

The present invention relates to radio communications. In one aspect, the invention relates to a gateway configured to provide a handover, converting and routing function.

BACKGROUND

Specifications for the next generation radio access network (RAN) are currently being developed by the 3rd Generation Partnership Project (3GPP). This so-called next generation RAN is referred to as the "Evolved Universal Terrestrial Radio Access Network (E-UTRAN)". Another name for E-UTRAN is the "Long Term Evolution (LTE)" RAN.

The LTE RAN is designed to be connected to a core network (CN), which is called the "Evolved Packet Core (EPC) network" or "System Architecture Evolution (SAE) network". The combination of an E-UTRAN and an EPC network is referred to as an "Evolved Packet System (EPS)" or an "LTE/SAE network". A base station in an E-UTRAN is called an "E-UTRAN NodeB" ("eNodeB" or "eNB" for short).

There is contemplation of having a base station that provides a coverage area smaller than the coverage area provided by a conventional (i.e. "macro") cellular base station. For example, it is contemplated to have base station that provides a coverage area for a home or a campus only. Such a base station is referred to herein as a "home base station". Other names for a home base station are "Home E-UTRAN NodeB (HeNB)", "LTE Home Access Point (LTE HAP)", "LTE Femto Access Point (LTE FAP)", "pico base station" and "femto base station". In an UTRAN ("Universal Terrestrial Radio Access Network", also known as 3G) system, a home base station is referred to as a "Home NodeB (HNB)". For simplicity, we shall refer to a "home base station" as an HeNB.

The HeNB is specified to provide essentially the same service to end users as an eNB and would be connected to the core network by, for example, using some kind of Internet Protocol (IP) based transmission. In this document, the coverage area serviced by an HeNB is called a femtocell (it is also sometimes referred to as a picocell when, for example, the coverage area provided by the HeNB encompasses a large office building or campus), and the coverage area serviced by an eNB is called a macrocell. Thus, as indicated above, an HeNB may be referred to herein as a "femto base station" and an eNB may be referred to as a "macro base station".

A perceived advantage of an HeNB is that it may be cheaper for an end user to receive a service when using an HeNB for network access versus using an eNB for network access. The HeNB would, in most cases, use the end user's already existing broadband connection (e.g. xDSL, Cable, etc.) to achieve connectivity to an operator's CN and possibly to other eNBs/HeNBs.

The current working assumption in the 3GPP LTE RAN specification is that the "X2 interface" is not used with HeNBs, but the X2 interface is used by eNBs to communicate with each other. The X2 interface between eNBs is used for handover, so called 'X2 based handover' and for Inter-cell Interference Control (ICIC). When an X2 connection is set up between two eNBs, the eNBs exchange information regarding the macrocells served by the eNB. Typically, an X2 connection is set up only between eNBs that serve cells between which handover may be performed. The protocol used for the X2 control plane is called the "X2 Application Protocol (X2AP)". The X2AP messages used for establishing an X2 connection between two eNBs are called the "X2 SETUP REQUEST" and the "X2 SETUP RESPONSE".

A mobile network may have up to a million or more HeNBs. It is doubtful that the capacity of the control nodes in the CN (e.g. a Mobility Management Entity (MME) or other core network control node) will be able to handle that many HeNBs. Therefore, an HeNB gateway (HeNB-GW), which is a type of concentrator node, is used to conceal the large number of HeNBs from the CN. That is, the HeNB-GW will, from the perspective of the CN, look like an eNB with many cells. Accordingly, the HeNB-GW communicates with the control nodes of the CN using the "S1 interface" in the same manner that an eNB communicates with the control nodes of the CN using the S1 interface. Functionally, the HeNB-GW acts as a proxy of the CN control node for all the HeNBs that are connected to the HeNB-GW (i.e. from the perspective of an HeNB, the HeNB-GW will appear to be a CN control node). That is, an HeNB communicates with a HeNB-GW using an S1 interface in the same manner that an eNB communicates with the control nodes of the CN using the S1 interface. In an UTRAN system, the gateway is referred to as a Home NodeB Gateway (HNB-GW).

The number of HeNBs connected to an HeNB-GW may be up to 100,000 or more. Thus, the number of femtocells "served" by an HeNB-GW may be up to 200,000 or more, assuming an HeNB serves up to two femtocells.

There exists two different procedures for performing a handover between eNBs. These are: (1) the "S1 based" handover procedure and (2) the "X2 based" handover procedure. As these names imply, the S1 based handover procedure uses an S1 interface between nodes of the E-UTRAN and the control nodes in the CN, whereas the X2 based handover procedure uses mainly the X2 interface between nodes of the E-UTRAN. The S1 based handover procedure is described in 3GPP TS 23.401, and the X2 based handover procedure is described in 3GPP TS 36.300. Both the S1 based handover procedure and the X2 based handover procedure can be applied to handovers between HeNBs, handovers from an HeNB to an eNB, and handovers from an eNB to an HeNB. However, X2 based handover is only possible if HeNBs uses the X2 interface.

A problem with using the S1 based handover procedures to transfer a connection from an HeNB/eNB to an eNB/HeNB, respectively, is that the S1 based handover procedure requires signaling towards the core network. Because it is expected that the RAN will include a large number of HeNBs, it is expected that there will be a large number of handovers from HeNBs to eNBs and vice versa. Consequently, using the S1 based handover procedure in the HeNB environment may significantly increase the signaling load seen by the core network. The X2 based handover procedure can decrease this signaling load, but this would require that the HeNBs implement at least some aspects of an X2 protocol, which would increase the cost and complexity of the HeNBs. Because HeNBs are expected to be mass-market devices, it is desired to keep them simple and cheap.

What is desired is an improved handover procedure.

SUMMARY

In one aspect, the present invention provides an improved method for handing over a connection from a source network node (e.g. a base station, such as an HeNB, HNB or other home base station, connected to a core network control node via a gateway) to a target network node (e.g. a base station connected to a core network control node via a point-to-point interface, such as the S1 interface). The improved method is performed by the gateway, which may be an HeNB-GW, HNB-GW or other concentrator node that acts as a proxy of a core network control node (e.g. MME) for a plurality of base stations (e.g. home base stations) that are communicatively connected to the gateway. In some embodiments, the method begins by receiving, at the gateway, a first handover message transmitted from the source network node. The first handover message indicates that a user equipment (UE) connection serviced by the source network node should be handed over to the target network node. In response to receiving the first handover message, the gateway generates a second handover message. After generating the second handover message, the gateway transmits to the target network node the second handover message. In this manner, the improved method provides the advantages of reducing the signaling load seen by the core network control nodes while at the same time not maintaining the relative simplicity of the home base stations.

In some embodiments, the first handover message is specified by a first protocol (e.g. the S1AP or X2AP protocol), and the second handover message is specified by a second protocol (e.g. the S1 or X2 protocol) that is different than the first protocol.

In some embodiments, the first protocol is the S1 AP protocol, the first handover message is a S1AP HANDOVER REQUIRED message, the second protocol is the X2AP protocol, and the second handover message is an X2AP HANDOVER REQUEST message. In such embodiments, the method may also include the steps of: receiving, at the gateway, an X2AP HANDOVER REQUEST ACKNOWLEDGE message transmitted from the target network node; transmitting, from the gateway, an S1AP HANDOVER COMMAND message to the source network node in response to receiving the X2AP HANDOVER REQUEST ACKNOWLEDGE message; receiving, at the gateway, an X2AP UE CONTEXT RELEASE message transmitted from the target network node; transmitting, from the gateway, to the source network node a S1AP UE CONTEXT RELEASE COMMAND message in response to receiving the X2AP UE CONTEXT RELEASE message; and receiving, at the gateway, an S1AP UE CONTEXT RELEASE COMPLETE message transmitted from the source network node.

In some embodiments, the source network node is a macro base station and the target network node is a home base station. In such embodiments, the first protocol is the X2AP protocol, the first handover message is an X2AP HANDOVER REQUEST message, the second protocol is the S1AP protocol, and the second handover message is a S1AP HANDOVER REQUEST message. Also, in such embodiments, the method may also include the steps of: receiving, at the gateway, an S1AP HANDOVER REQUEST ACKNOWLEDGE message transmitted from the target network node; generating, at the gateway, an X2AP HANDOVER REQUEST ACKNOWLEDGE message in response to receiving the S1AP HANDOVER REQUEST ACKNOWLEDGE message; transmitting, from the gateway, to the source network node the X2AP HANDOVER REQUEST ACKNOWLEDGE message; receiving, at the gateway, an S1AP HANDOVER NOTIFY message transmitted from the target network node; generating, at the gateway, an S1AP PATH SWITCH REQUEST message in response to receiving the S1AP HANDOVER NOTIFY message; transmitting, from the gateway, the S1AP PATH SWITCH REQUEST message to a core network node; generating, at the gateway, an X2AP UE CONTEXT RELEASE message after receiving the SLAP HANDOVER NOTIFY message; and transmitting, from the gateway, to the source network node the X2AP UE CONTEXT RELEASE message.

In some embodiments, the gateway is a base station concentrator node that provides a gateway service to multiple base stations (e.g. multiple HeNBs) and that is configured to communicate with a Mobility Management Entity (MME) using an S1 interface.

In some embodiments, the step of generating the second handover message comprises one or more of the following steps: (i) extracting certain information from the first handover message and including the extracted information in the second handover message; (ii) retrieving previously stored information that was included in a control message received at the gateway, wherein the control message relates to a connection established with the UE, and including the retrieved information in the second handover message; and (iii) mapping information included in the first handover message to information required to be included in the second handover message.

In some embodiments, the step of generating the second handover message occurs in response to (a) receiving the first handover message and (b) determining that the gateway is able to transmit the second handover message to the target network node.

In some embodiments, the method may also include the steps of: receiving, at the gateway, a third handover message transmitted from a second source network node, the third handover message indicating that a UE serviced by the second source network node should be handed over to a second target network node; if the gateway can not communicate with the second target node, then forwarding the third handover message to a core network node; and if the gateway can communicate with the second target node, then generating, at the gateway, a fourth handover message and transmitting, from the gateway, to the second target network node the fourth handover message.

In another aspect, the present invention provides a gateway apparatus for facilitating the handover of a connection from a source network node to a target network node. In some embodiments, the gateway apparatus includes: a data storage system storing computer software, a data processing system for executing the computer software, and a transmit and receive module for (a) receiving messages transmitted from the source network node such as a first handover message that indicates that a user equipment (UE) serviced by the source network node should be handed over to the target network node and (b) transmitting messages. Advantageously, the computer software is configured such that when the computer software is executed by the data processing system, the data processing system, in response to receiving the first handover message, uses the transmit and receive module to transmit to the target network node a second handover message that was generated by the processing system if the processing system is capable of communicating with the target network node. The computer software is further configured such that when the computer software is executed by the data processing system the data processing system is operable to function as a proxy of a core network control node for a plurality of base stations that are communicatively connected to the gateway apparatus.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

The present invention is described herein in the context of an LTE network, but the invention is not so limited (i.e. the invention could also apply to other networks such as a 3G network and other interfaces and protocols).

Figure 1:
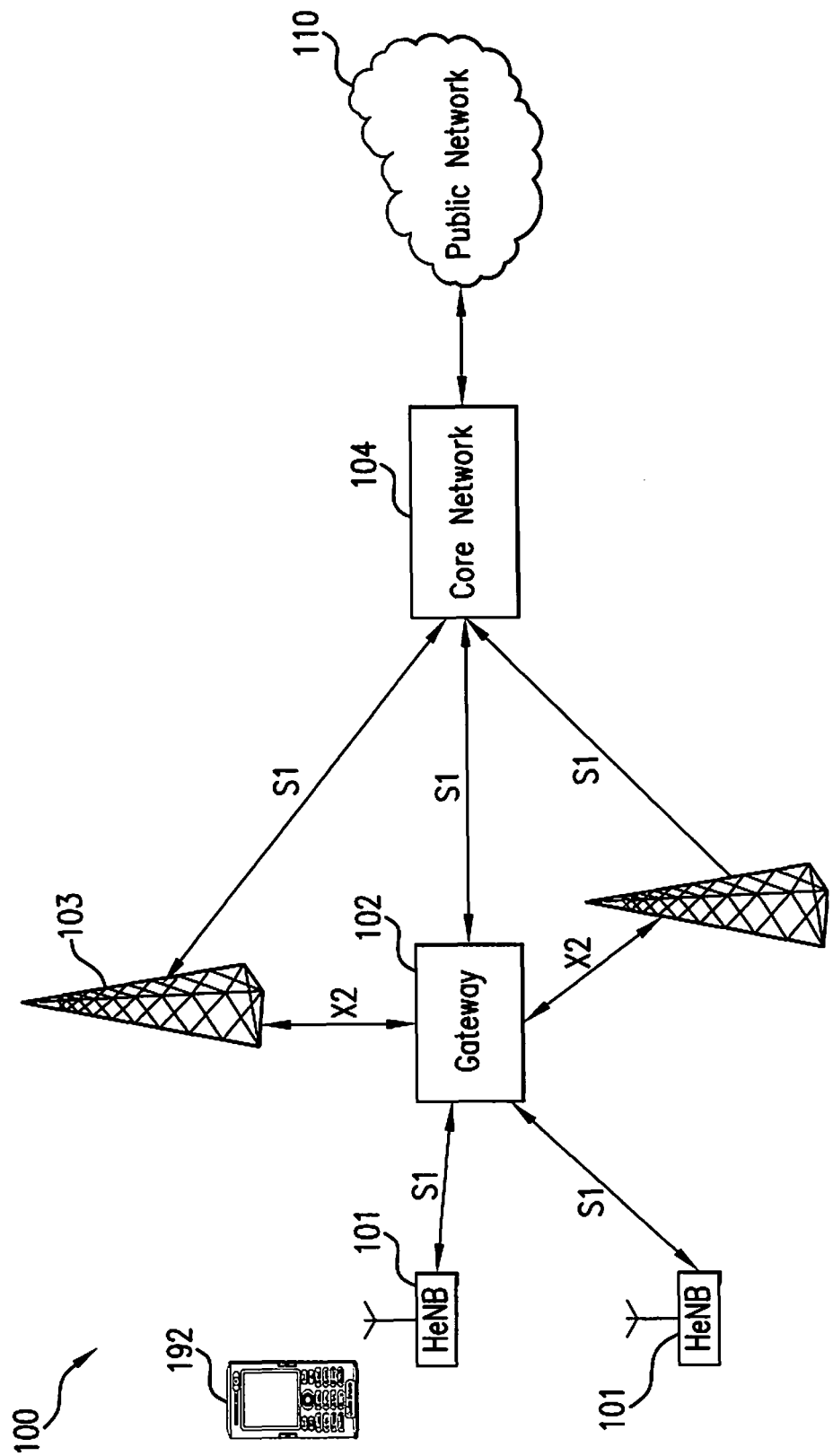
FIG. 1 illustrates a network according to an embodiment of the invention.

Referring now to FIG. 1, FIG. 1 illustrates a wireless communication system 100 according to an embodiment of the invention. As shown, system 100 includes HeNBs 101 serving femtocells, eNBs 103 serving macrocells, a gateway 102 (e.g. HeNB-GW, HNB-GW, or other gateway), and a CN 104 having at least one control node (e.g. MME 392—see FIG. 3). These components enable a user of user equipment (UE) 192 to communicate with other devices and systems (e.g. other devices and systems connected to public network 110).

An aspect of the present invention provides an improved gateway 102. In some embodiments, the improved gateway 102 enables a connection to be handed over from an HeNB 101 to an eNB 103 without having to involve a control node of CN 104. For example, in some embodiments, the gateway 102 is configured to receive a first handover message transmitted from a source network node (e.g., HeNB 101, eNB 103), where the first handover message indicates that a UE 192 connection serviced by the source network node should be handed over to a target network node (e.g., HeNB 101, eNB 103). In response to receiving the first handover message, the gateway 102 generates a second handover message and transmits to the target network node the second handover message. In this manner, the gateway 102 provides the distinct advantage of reducing the signaling load seen by the core network control nodes (e.g., MMEs). The gateway 102 may communicate with the source base station using an interface between the gateway and source base station (e.g., the S1 interface). Likewise, the gateway may communicate with the target base station using an interface between the gateway and target base station (e.g., the X2 interface). The interface between the gateway and target base station may have been established previously, or it could be set up when required, i.e. as part of the handover procedure described above. Although the following description will refer to the S1 and X2 interfaces and related S1 application protocol (S1AP) and X2 application protocol (X2AP) messages to exemplify some embodiments of the present solution, the handover process may also be implemented using another type of interface between the gateway and target base station and gateway and source base station.

Figure 2:
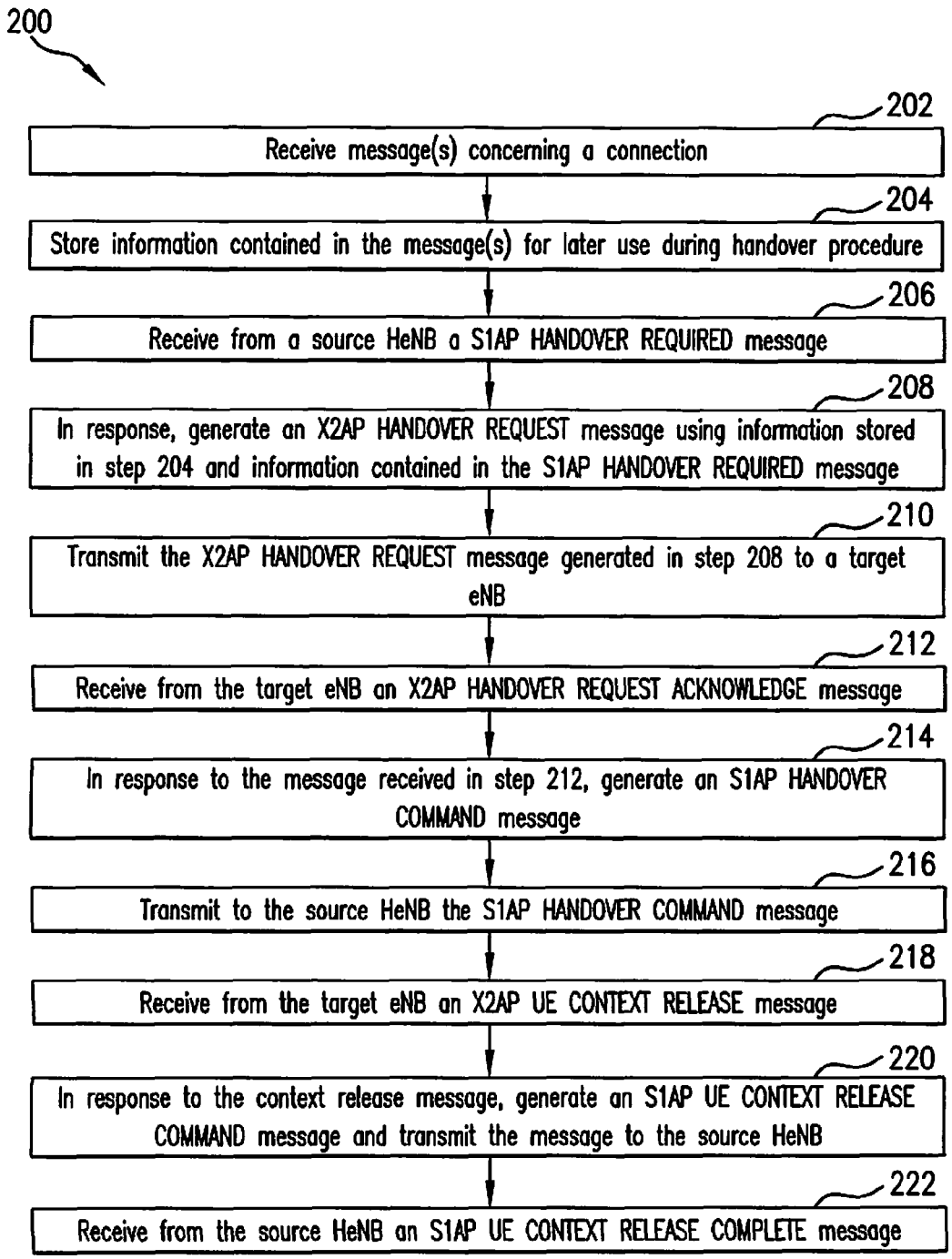
FIG. 2 is a flow chart illustrating a process according to an embodiment of the invention.

Referring now to FIG. 2, FIG. 2 is a flow chart illustrating one specific process 200, according to some embodiments of the invention, that is performed by gateway 102 to implement the process described above. Process 200 may begin in step 202, where gateway 102 receives from an HeNB 101 and/or eNB 103 and/or CN 104 (e.g. from an MME 392) one or more control messages concerning a UE 192 connection. For example, gateway 102 may receive S1AP protocol control messages from MME 392, such as, for example, an S1AP INITIAL CONTEXT SETUP REQUEST message and an S1AP E-RAB SETUP/MODIFY REQUEST message. Likewise, in step 202, gateway 102 may receive X2AP handover related messages from an eNB 103. Next (step 204), gateway 102 stores information (e.g, information elements (IEs) or portions thereof) contained in the above mentioned S1AP/X2AP messages for later use during a handover procedure.

Figure 3:
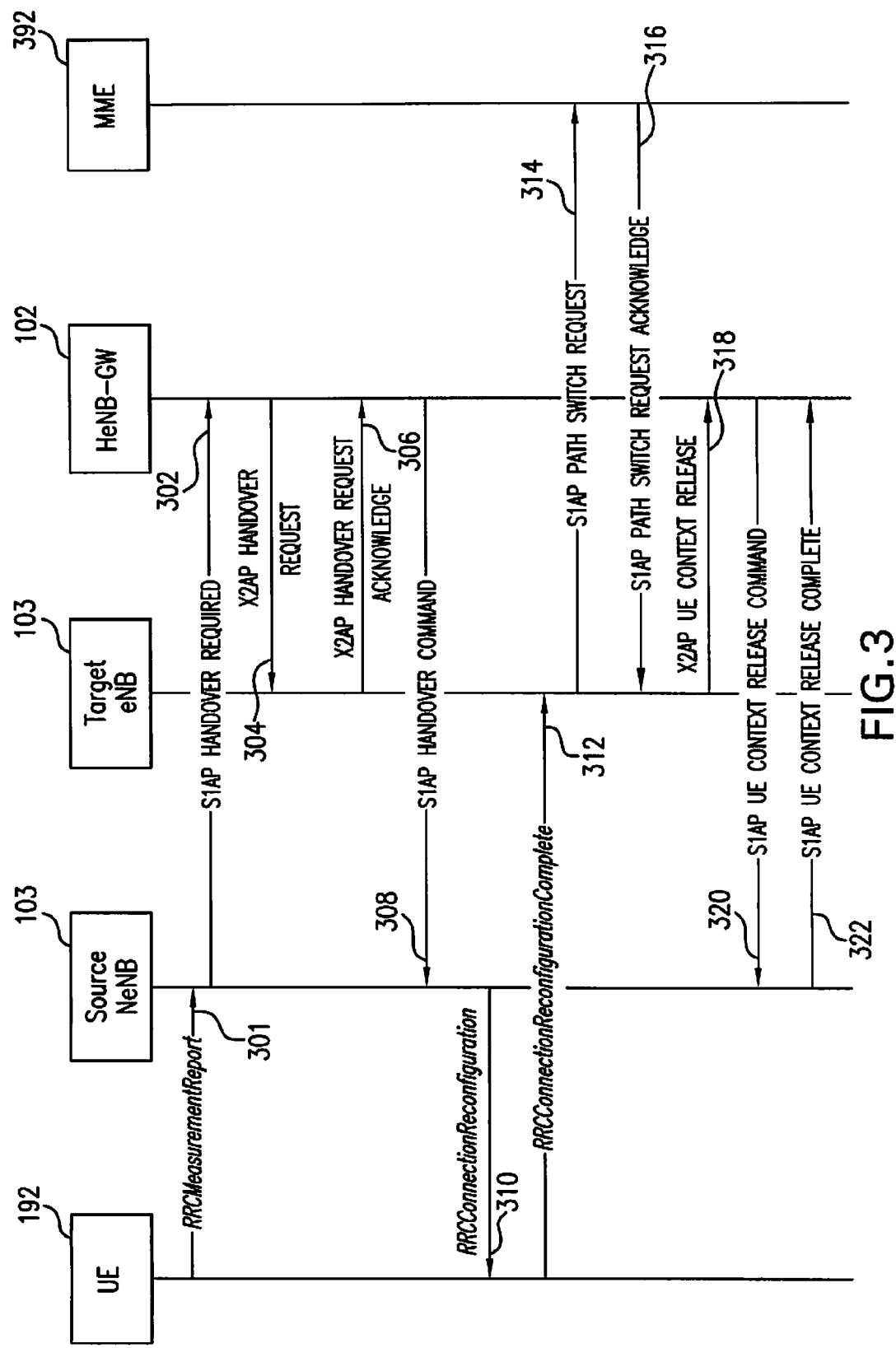
FIG. 3 is a message flow diagram further illustrating the process shown in FIG. 2.

Next (step 206), gateway 102 receives from a source HeNB 101 a S1AP HANDOVER REQUIRED message 302 (see FIG. 3, which shows a message flow according to an embodiment of the invention). Message 302 includes a set of IEs. Typically, one or more measurement report messages 301 (e.g. an RRC MeasurementReport message as defined in 3GPP TS 36.331) transmitted to the source HeNB 101 from the UE 192 triggers the source HeNB 101 to begin the handover process (i.e. causes source HeNB 101 to transmit message 302).

In direct response to receiving the handover message 302, gateway 102 may determine whether it can communicate with a target eNB via an X2 interface. If it can, the process proceeds to step 208, otherwise, gateway 102 forwards message 302 to a core network node (e.g. MME 392) in CN 104. In step 208, gateway 102 generates an X2AP HANDOVER REQUEST message 304. The X2AP HANDOVER REQUEST message 304 requires a particular set of IEs. Table 1 below shows a list of at least some of the IEs that are required to be included in X2AP HANDOVER REQUEST message 304.

TABLE 1

| IE needed for the X2AP HANDOVER REQUEST | Exemplary sources for the information |
| --- | --- |
| Message Type | Defined in 3GPP TS 36.423 |
| Old eNB UE X2AP ID | Previously Allocated by the HeNB-GW |

TABLE 1-continued

| IE needed for the X2AP HANDOVER REQUEST | Exemplary sources for the information |
|---|---|
| Cause Value | Cause value included in the S1AP HANDOVER REQUIRED message (may need to map the S1AP cause value to a valid X2AP cause value). |
| Target Cell ID | The S1AP HANDOVER REQUIRED message contains the Target Cell ID. (The Target ID field in the S1AP HANDOVER REQUIRED message contains the eNB-ID of the Target eNB. In some cases, this IE could also contain the target cell identity -- like when the target eNB is really a HeNB) |
| GUMMEI | The HeNB-GW knows the GUMMEI as it selected this for the UE once a signalling connection was established. |
| MME UE S1AP ID | The HeNB-GW obtained this information for example from the S1AP INITIAL CONTEXT SETUP REQUEST message. |
| Aggregate Maximum Bit Rate | This optional IE can be received for example in the S1AP INITIAL CONTEXT SETUP REQUEST message. |
| Subscriber Profile ID for RAT/Frequency priority | This optional IE can be received for example in the S1AP INITIAL CONTEXT SETUP REQUEST message. |
| E-RAB ID | The Source eNodeB to Target eNodeB Transparent Container IE from the S1AP HANDOVER REQUIRED message contains the E-RAB ID field. |
| E-RAB Level QoS Parameters | This IE can be received for example in the S1AP INITIAL CONTEXT SETUP REQUEST message for the default E-RAB or in the S1AP E-RAB SETUP/MODIFY REQUEST message(s) for any other bearers. |
| DL Forwarding | The Source eNodeB to Target eNodeB Transparent Container IE from the S1AP HANDOVER REQUIRED message contains the DL Forwarding field. |
| UL GTP Tunnel Endpoint | This IE contains both the Transport Layer Address and the GTP TEID. These can be received for example in the S1AP INITIAL CONTEXT SETUP REQUEST message for the default E-RAB or in the S1AP E-RAB SETUP REQUEST message for any other bearers. |
| RRC Context | The Source eNodeB to Target eNodeB Transparent Container IE from the S1AP HANDOVER REQUIRED message contains the RRC Container field. |
| Handover Restriction List | This optional IE can be transferred from the MME to the HeNB in many different messages and the HeNB-GW can store the information. One example is the S1AP INITIAL CONTEXT SETUP REQUEST message. |
| Location Reporting Information | This optional IE can be transferred from the MME to the HeNB in many different messages and the HeNB-GW can store the information. One example is the S1AP INITIAL CONTEXT SETUP REQUEST message. |
| UE History Information | This optional IE can be obtained by the HeNB-GW for multiple cells can in case of handover is performed so that the HeNB-GW can store the information. |
| Trace Activation | This optional IE can be transferred from the MME to the HeNB in many different messages and the HeNB-GW can store the information. One example is the S1AP INITIAL CONTEXT SETUP REQUEST message. |

As indicated in the table above, some of the information that is required to be included in the X2AP HANDOVER REQUEST message 304 is: (a) included in the S1AP HANDOVER REQUIRED message 302, (b) included in the messages received in step 202 or other step (e.g. step 206), (c) previously generated or allocated by gateway 102, and/or (d) associated with IEs previously received by gateway 102 or included in S1AP HANDOVER REQUIRED message 302. Accordingly, in some embodiments, gateway 102 generates the X2AP HANDOVER REQUEST message 304 by any combination of the following: (i) extracting certain information from the S1AP HANDOVER REQUIRED message 302, (ii) retrieving information stored in step 204 or in any other preceding step, (iii) retrieving previously allocated information, (iv) mapping information included in the S1AP HANDOVER REQUIRED message 302 to information required to be included in X2AP Handover message 304, and (v) using predefined default values.

In other words, the contents of the messages used in X2 and S1 based handovers differ, and it is not possible to copy all the needed IEs from the message triggering the Handover conversion function (e.g. not all IEs needed in the X2AP HANDOVER REQUEST message can be found in the S1AP HANDOVER REQUIRED message). The following are some different possibilities on how the different information can be found: (1) gateway 102 keeps state and related information from a previous signaling related to the signaling connection (and the associated bearers) that is to be handed over (e.g. received during initial context setup or E-RAB setup or E-RAB modify or previous handover into HeNB, via the HeNB-GW); (2) gateway 102 copies the information from the message triggering the Handover conversion (e.g. from S1AP HANDOVER REQUIRED message to X2AP HANDOVER REQUEST message); (3) gateway 102 keeps state and related information during the handover preparation to handover execution (e.g. from the $1^{st}$ message to the $3^{rd}$ message and one example is that information is stored in the HeNB-GW from S1AP HANDOVER REQUIRED message and then used in the S1AP HANDOVER COMMAND); and (4) use predefined default values for some of the IEs.

The eNB/HeNB nodes may also, as part of the handover procedure, send messages to inform about the status of received user data, e.g. the X2AP SN STATUS TRANSFER message, the S1AP eNB STATUS TRANSFER message and the S1AP MME STATUS TRANSFER message depending on sending entity. These messages are not shown in the following message flow diagrams, but it's assumed that the above applied principals can be used in the gateway for the mapping. The mapping principle for an S1AP eNB STATUS TRANSFER message to an X2AP SN STATUS TRANSFER message is shown in table 2 below.

TABLE 2

| The IEs in the X2AP SN STATUS TRANSFER message (as defined in 3GPP TS 36.423 v8.2.0) | Exemplary sources for the information |
|---|---|
| Message Type | Defined in 3GPP TS 36.413 |
| Old eNB UE X2AP ID | Obtained by the HeNB-GW during earlier X2AP signaling. |
| New eNB UE X2AP ID | Obtained by the HeNB-GW during earlier X2AP signaling. |
| E-RAB ID | Taken from eNB Status Transfer Transparent Container received in S1AP eNB STATUS TRANSFER message |

TABLE 2-continued

| The IEs in the X2AP SN STATUS TRANSFER message (as defined in 3GPP TS 36.423 v8.2.0) | Exemplary sources for the information |
|---|---|
| Receive status of UL PDCP SDUs | Use a predefined default value |
| UL COUNT value | Taken from eNB Status Transfer Transparent Container received in S1AP eNB STATUS TRANSFER message |
| DL COUNT value | Taken from eNB Status Transfer Transparent Container received in S1AP eNB STATUS TRANSFER message |

Next (step 210), gateway 102 transmits the X2AP HANDOVER REQUEST message 304 to the target eNB over an X2 interface. Next (step 212), gateway 102 receives from the target eNB an X2AP HANDOVER REQUEST ACKNOWLEDGE message 306. In response, gateway 102 determines whether the X2AP HANDOVER REQUEST ACKNOWLEDGE message 306 was transmitted in response to the X2AP HANDOVER REQUEST message 304. If it was, the process proceeds to step 214. In step 214, gateway 102 generates an S1AP HANDOVER COMMAND message 308.

The S1AP HANDOVER COMMAND message 308 requires a particular set of IEs. Referring now to table 3 below, table 3 shows a list of at least some of the IEs that are required to be included in S1AP HANDOVER COMMAND message 308.

TABLE 3

| The IEs in the S1AP HANDOVER COMMAND message (as defined in 3GPP TS 36.413 v8.3.0) | Exemplary sources for the information |
|---|---|
| Message Type | Defined in 3GPP TS 36.413 |
| MME UE S1AP ID | Learnt by the HeNB-GW during earlier S1AP signalling. |
| eNB UE S1AP ID | Learnt by the HeNB-GW during earlier S1AP signalling. |
| Handover Type | Set to value "IntraLTE" as this is the only value that applies in this case. |
| E-RAB ID | May be included in the X2AP HANDOVER REQUEST ACKNOWLEDGE message |
| DL Transport Layer Address | May be included in the X2AP HANDOVER REQUEST ACKNOWLEDGE message |
| DL GTP TEID | May be included in the X2AP HANDOVER REQUEST ACKNOWLEDGE |
| E-RAB ID | May be included in the X2AP HANDOVER REQUEST ACKNOWLEDGE message |
| Target eNB to Source eNB Transparent Container | Received in the HeNB-GW in the X2AP HANDOVER REQUEST ACKNOWLEDGE message in the Target eNB To Source eNB Transparent Container IE. |
| Criticality Diagnostics | May be included in the X2AP HANDOVER REQUEST ACKNOWLEDGE message |

As indicated in Table 3, some of the information that is required to be included in the S1AP HANDOVER COMMAND message 308 is: (a) included in the X2AP HANDOVER REQUEST ACKNOWLEDGE message 306 or (b) included in the messages received in step 202 or other step (e.g. step 206). Accordingly, in some embodiments, gateway 102 generates the S1AP HANDOVER COMMAND message 308 by any combination of the following: (i) extracting certain information from the X2AP HANDOVER REQUEST ACKNOWLEDGE message 306, (ii) retrieving information stored in step 204 or in any other preceding step, (iii) retrieving previously allocated information; (iv) mapping information included in the X2AP HANDOVER REQUEST ACKNOWLEDGE message 306 to information required in the S1AP HANDOVER COMMAND message 308, and (v) using predefined default values.

Next (step 216), gateway 102 transmits S1AP HANDOVER COMMAND message 308 to the source HeNB via an S1 interface. In response, the source HeNB transmits a handover command message 310 (e.g. an RRC RRCConnectionReconfiguration message) to the UE. In response to message 310, the UE transmits a handover confirm message 312 (e.g. an RRC RRCConnectionReconfigurationComplete message) to the target eNB, which then may transmit an S1AP PATH SWITCH REQUEST message 314 to a control node (e.g. MME) of CN 104. The control node (or another control node) may respond by transmitting to the target eNB an S1AP PATH SWITCH REQUEST ACKNOWLEDGE message 316, and the target eNB may respond to message 316 by transmitting an X2AP UE CONTEXT RELEASE message 318 to gateway 102.

In step 218 of process 200, gateway 102 receives from the target eNB the X2AP UE CONTEXT RELEASE message 318. If gateway 102 determines that message 318 relates to message 308, then the process proceeds to step 220. In step 220, gateway 102 generates an S1AP UE CONTEXT RELEASE COMMAND message 320 and transmits the S1AP UE CONTEXT RELEASE COMMAND message 320 to the source HeNB.

The S1AP UE CONTEXT RELEASE COMMAND message 320 requires a particular set of IEs. Referring now to Table 4 shown below, Table 4 shows a list of at least some of the IEs that are required to be included in S1AP UE CONTEXT RELEASE COMMAND message 320.

TABLE 4

| The IEs in the S1AP UE CONTEXT RELEASE COMMAND message (as defined in 3GPP TS 36.413 v8.3.0) | Exemplary sources for the information |
|---|---|
| Message Type | Defined in 3GPP TS 36.413 |
| UE S1 AP ID pair | Learnt by the HeNB-GW during earlier S1AP signalling. This IE contains both the eNB UE S1AP ID and the MME UE S1AP ID |
| MME UE S1AP ID | Learnt by the HeNB-GW during earlier S1AP signalling. |
| Cause | In this field the "Successful Handover" cause can be used as the target eNB indicates with X2AP UE CONTEXT RELEASE that the handover was successful. |

As indicated in Table 4, some of the information that is required to be included in the S1AP UE CONTEXT RELEASE COMMAND message 320 is: (a) included in the X2AP UE CONTEXT RELEASE message 318 or (b) included in messages received in step 202 or other step (e.g. step 206). Accordingly, in some embodiments, gateway 102 generates the S1AP UE CONTEXT RELEASE COMMAND message 320 by any combination of the following: (i) extracting certain information from X2AP UE CONTEXT RELEASE message 318, (ii) retrieving information stored in step 204 or in any other preceding step, (iii) retrieving previously allocated information, (iv) mapping information included in the X2AP UE CONTEXT RELEASE message 318 to information required to be included in the S1AP UE CONTEXT RELEASE COMMAND message 320, and (v) using predefined default values. For example, as shown in Table 4, one of the IEs required to be included in message 320 is a "cause" value. As further shown in table 4, gateway 102 may be configured to set the cause value to "successful handover" if the X2AP UE CONTEXT RELEASE message 318 indicates that the handover was successful. In step 222, gateway 102 receives from the source HeNB an S1AP UE CONTEXT RELEASE COMPLETE message 322.

Figure 4:
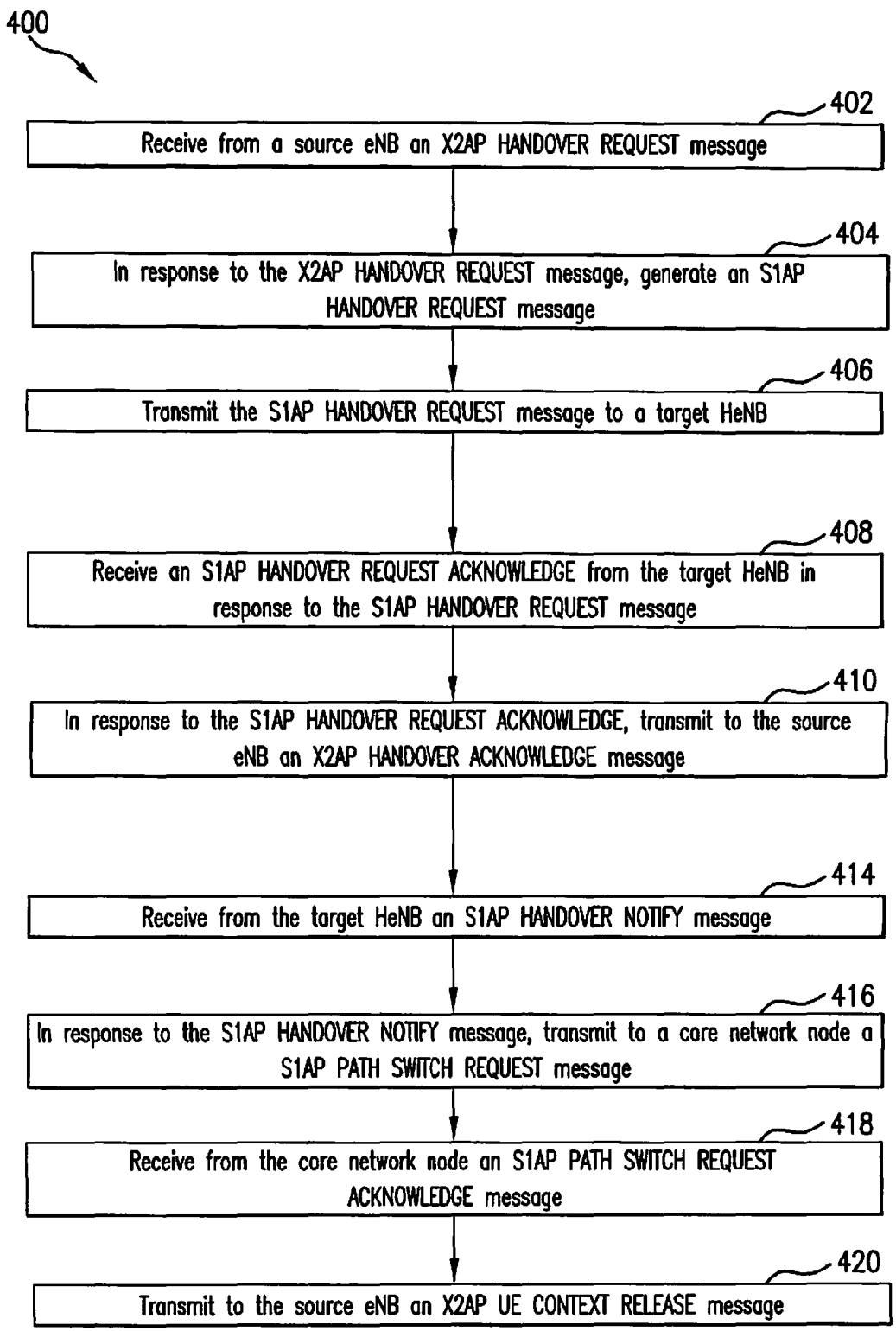
FIG. 4 is a flow chart illustrating a process according to an embodiment of the invention.

In some embodiments, gateway 102 enables a connection to be handed over from a source eNB 103 to a target HeNB 101. Referring now to FIG. 4, FIG. 4 illustrates a process 400, according to some embodiments of the invention that is performed by the improved gateway 102.

Figure 5:
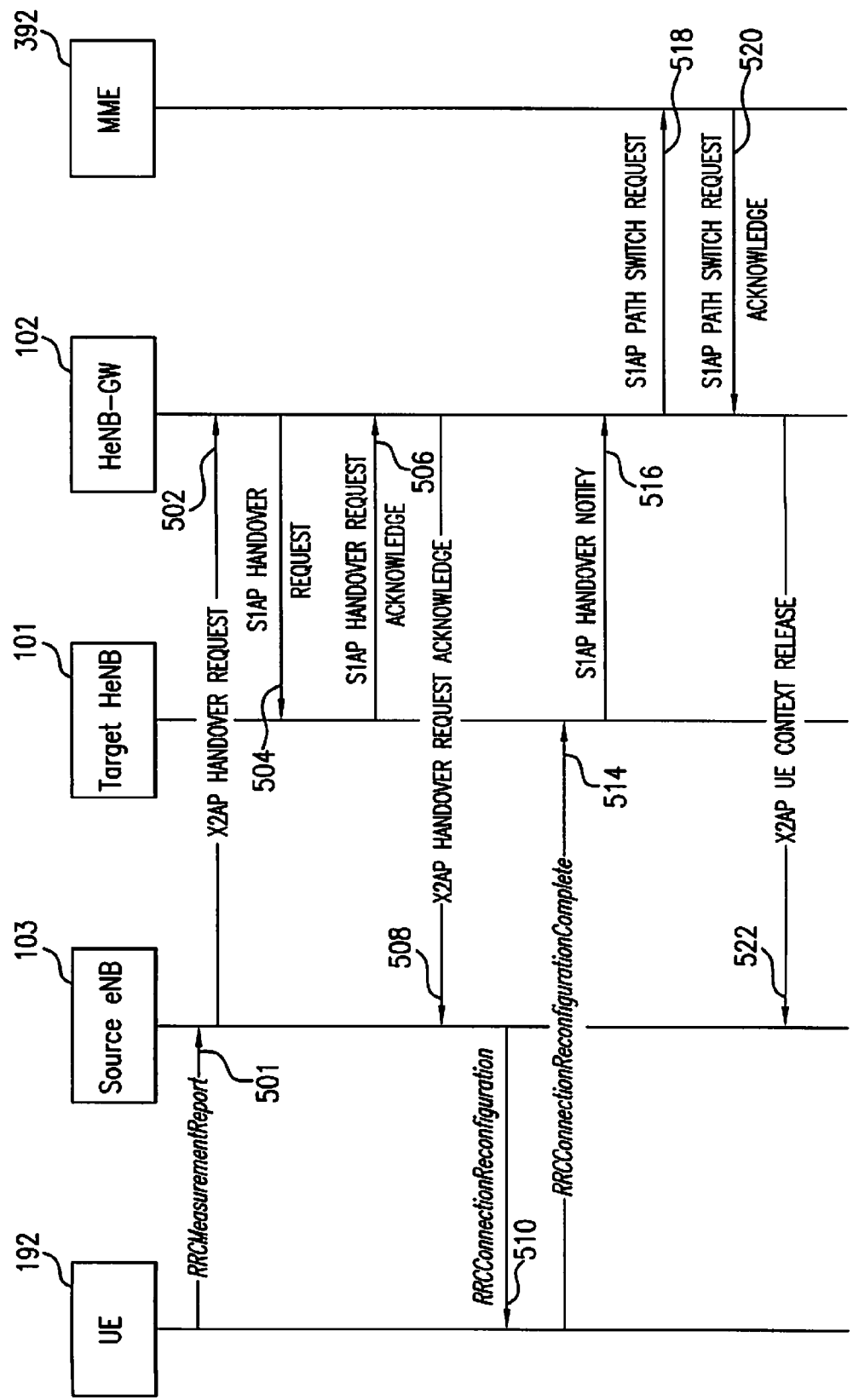
FIG. 5 is a message flow diagram further illustrating the process shown in FIG. 4.

Process 400 may begin in step 402, where gateway 102 receives from the source eNB an X2AP HANDOVER REQUEST message 502 (see FIG. 5, which shows a message flow according to an embodiment of the invention). In response, gateway 102 determines whether there exists an S1 interface towards the target HeNB serving the target cell. This determination is based on the S1 setup performed between the target HeNB and the HeNB-GW as during this S1 setup the target HeNB sends its eNB-ID to the HeNB-GW. As the current definition is that the eNB-ID is included in the Cell identity, this means that the HeNB-GW will know the eNB-ID of the HeNBs connected to it (at least in the case when each HeNB serves a single femtocell). If gateway 102 determines that there exists an S1 interface towards the target HeNB, then the process proceeds to step 404.

In step 404, gateway 102 generates an S1AP HANDOVER REQUEST message 504 in response to receiving message 502 and detecting that gateway 102 has an S1 interface with the target HeNB. Gateway 102 finds the information needed for the S1AP HANDOVER REQUEST message 504 using the principles disclosed above. That is, gateway 102 uses previously stored, generated and/or received information, as described herein, to generate message 504.

Next (step 406), gateway 102 transmits to the target HeNB the S1AP HANDOVER REQUEST message 504. Next (step 408), gateway 102 receives from the target HeNB an S1AP HANDOVER REQUEST ACKNOWLEDGE message 506. Next (step 410), gateway 102 detects that this response message 506 relates to message 504, and, in response, generates an X2AP HANDOVER REQUEST ACKNOWLEDGE message 508 and transmits message 508 to the source eNB. Gateway 102 finds the information needed for the X2AP HANDOVER REQUEST ACKNOWLEDGE message 508 using the principles disclosed above. That is, gateway 102 uses previously stored, generated and/or received information, as described herein, to generate message 508.

In response to message 508, the source eNB transmits a handover command message 510 (e.g. an RRC RRCConnectionReconfiguration message) to the UE whose connection is the target of the handover. After receiving the handover command message 510, the UE may transmit a handover confirm message 514 (e.g. an RRC RRCConnectionReconfigurationComplete message) to the target HeNB, which, in turn, transmits an S1AP HANDOVER NOTIFY message 516 to gateway 102. In step 414, gateway 102 receives from the target HeNB the S1AP HANDOVER NOTIFY message 516 and determines whether message 516 relates to message 504. If it does, the process proceeds to step 416. As gateway 102 has so far hidden the ongoing handover from the core network, gateway 102 needs to update the core network about the performed handover. This is accomplished by generating a S1AP PATH SWITCH REQUEST message 518 and sending message 518 towards the core network (e.g. an MME in the core network) (this message is normally only used for X2-based handover) (step 416). Gateway 102 finds the information needed for the message 518 using the principles disclosed above. That is, gateway 102 uses previously stored, generated and/or received information, as described herein, to generate message 518.

Next (step 418), gateway 102 receives from the core network (e.g. from the MME) an S1AP PATH SWITCH REQUEST ACKNOWLEDGE message 520.

In step 420, gateway 102 transmits an X2AP UE CONTEXT RELEASE message 522 to the source eNB thereby triggering the release of resource in the source eNB. Gateway 102 finds the information needed for the message 522 using the principles disclosed above. That is, gateway 102 uses previously stored, generated and/or received information, as described herein, to generate message 522.

It should be noted that FIGS. 3 and 5 are simplified in the sense that neither the MME nor the Serving GW is reallocated in these figures. The reallocation of these nodes doesn't contain any HeNB specific signaling. The details of forwarding of user data are also not shown as these are not important for these flows (i.e. there are no significant differences towards the well-known signaling flows).

A benefit of configuring gateway 102 to perform process 200 and/or 400 is that it results in less signalling load toward the core network 104 and enables the HeNBs to remain simple (i.e. the HeNBs 101 do not need to implement the X2 interface and related procedures).

Figure 7:
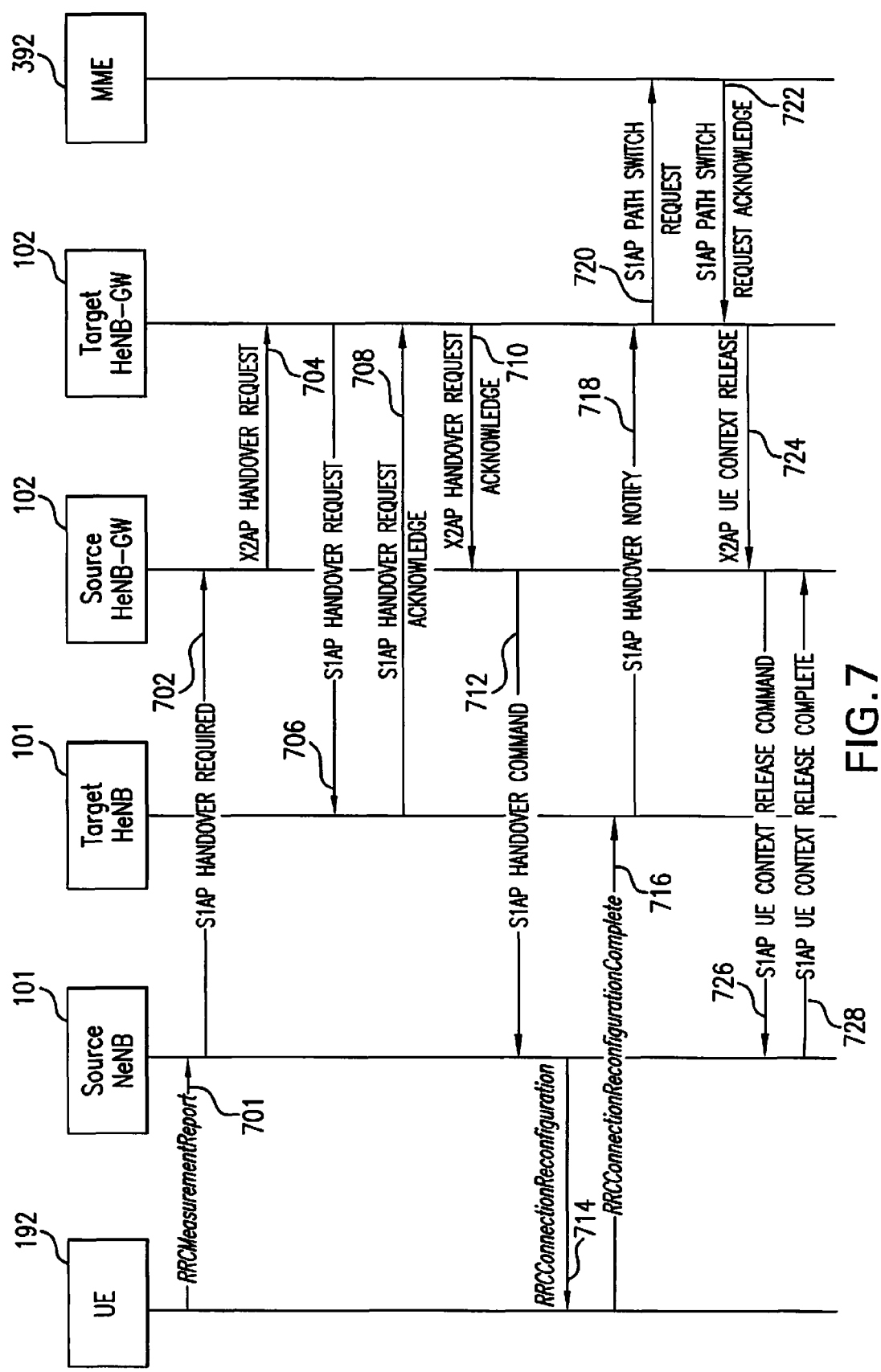
FIG. 7 is a message flow diagram according to another embodiment of the invention.

Referring now to FIG. 7, FIG. 7 illustrates a message flow according to another aspect of the invention. In this aspect, a source node HeNB 101 is connected to one gateway 102 (the source gateway) and a target HeNB is connected to another gateway 102 (the target gateway). As shown in FIG. 7, a UE 192 connected to the source node may transmit an RRCMeasurementReport message 701 to the source node. This message may trigger a handover. That is, message 701 may trigger the source node to transmit an S1AP HANDOVER REQUIRED message 702 to the source gateway. In response, the source gateway transmits an X2AP HANDOVER REQUEST message 704 to the target gateway. In response, the target gateway transmits an S1AP HANDOVER REQUEST message 706 to the target node. In response, the target node transmits an S1AP HANDOVER REQUEST ACKNOWLEDGE message 708 to the target gateway. In response, the target gateway transmits and X2 AP HANDOVER REQUEST ACKNOWLEDGE message 710 to the source gateway. In response, the source gateway transmits an S1AP HANDOVER COMMAND message 712 to the source node. In response, the source node transmits an RRCConnectionReconfiguration message 714 to the UE. In response, the UE transmits an RRCConnectionReconfigurationComplete message 716 to the target node. In response, the target node transmits an S1AP HANDOVER NOTIFY message 718 to the target gateway. In response, the target gateway transmits an S1AP PATH SWITCH REQUEST message 720 to MME 392. In response, MME 392 transmits an S1AP PATH SWITCH REQUEST ACKNOWLEDGE message 722 to the target node. In response, the target node transmits an X2AP UE CONTEXT RELEASE message 724 to the source gateway. In response, the source gateway transmits an S1AP UE CONTEXT RELEASE COMMAND message 726 to the source node. In response, the source node transmits an S1AP UE CONTEXT RELEASE COMPLETE message 728 to the source gateway.

Figure 6:
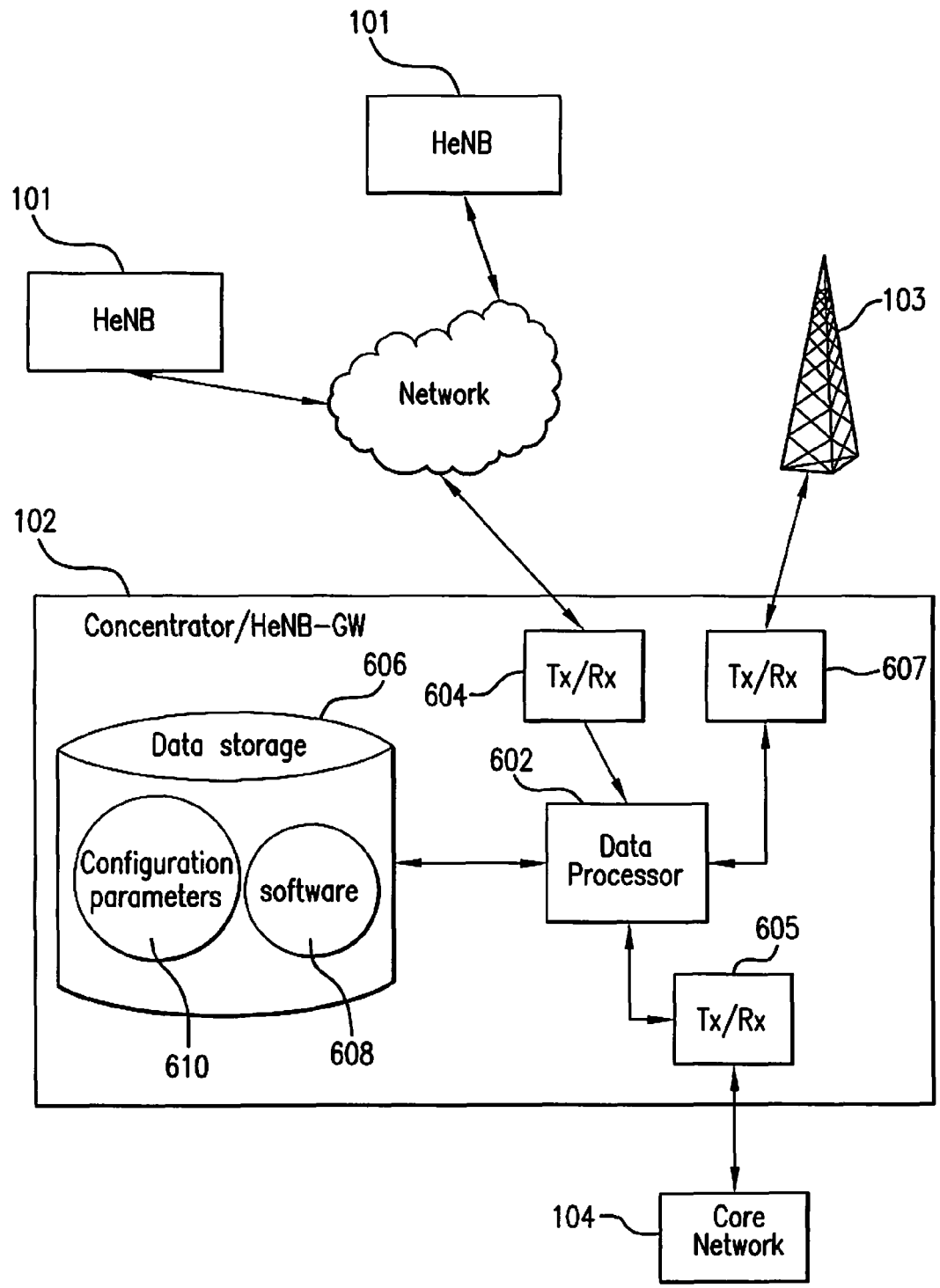
FIG. 6 is a functional block diagram of a gateway according to an embodiment of the invention.

Referring now to FIG. 6, FIG. 6 is a functional block diagram of gateway 102 according to some embodiments of the invention. As shown, gateway 102 may comprise a data processing system 602 (e.g. one or more microprocessors, one or more integrated circuits, such as an application specific integrated circuit (ASIC), Field-programmable gate arrays (FPGAs), etc. and any combination of these), a data storage system 606 (e.g. one or more non-volatile storage devices) and computer software 608 stored on the storage system 606. Configuration parameters 610 may also be stored in storage system 606. Gateway 102 may also include transmit/receive (Tx/Rx) circuitry for communicating with eNBs 103, HeNBs 101 and CN 104. For example, gateway 102 may include Tx/Rx module 604 for transmitting data to and receiving data from HeNBs 101, Tx/Rx module 605 for transmitting data to and receiving data from, for example, core network 104, and Tx/Rx module 607 for transmitting data to and receiving data from eNBs 103. In some embodiments, software 608 is configured such that when processing system 602 executes software 608, gateway 102 performs steps described above with reference to the flow charts shown in FIG. 2 and/or FIG. 4. In other embodiments, data processing system 602 is configured to perform steps described above with reference to the flow charts shown in FIG. 2 and/or FIG. 4 without the need for software 608. That is, for example, data processing system may consist merely of one or more ASICs. Hence, the features of the present invention described above may be implemented in hardware and/or software.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for handing-over a connection from a source network node to a target network node, the method comprising:
receiving, at a gateway, a first handover message transmitted from the source network node, the first handover message indicating that a user equipment (UE) connection, serviced by the source network node, should be handed over to the target network node;
generating, at the gateway, a second handover message in response to receiving the first handover message; and
transmitting, from the gateway to the target network node, the second handover message,
wherein the gateway is a concentrator node that is distinct from and acts as a proxy of a core network control node for a plurality of base stations that are communicatively connected to the gateway, and
wherein the generating the second handover message comprises:
extracting information from the first handover message and including the information from the first handover message that was extracted in the second handover message;
retrieving previously stored information that was included in a control message received at the gateway, wherein the control message relates to a connection established with the UE, and including the previously stored information that was retrieved in the second handover message;
mapping the information from the first handover message to information required to be included in the second handover message;
including one or more predefined default values in the second handover message; and
retrieving previously allocated information and including said retrieved previously allocated information in the second handover message.

2. The method of claim 1, wherein
the first handover message is specified by a first protocol, and
the second handover message is specified by a second protocol that is different than the first protocol.

3. The method of claim 2, wherein the source network node is a home base station and the target network node is a macro base station.

4. The method of claim 3, wherein the gateway is a concentrator node that acts as a proxy of the core network control node for a plurality of home base stations that are communicatively connected to the gateway.

5. The method of claim 3, wherein the first protocol is the S1AP protocol, the first handover message is a S1AP HANDOVER REQUIRED message, the second protocol is the X2AP protocol, and the second handover message is an X2AP HANDOVER REQUEST message.

6. The method of claim 2, wherein the source network node is a macro base station and the target network node is a home base station.

7. The method of claim 6, wherein the gateway is a concentrator node that acts as a proxy of the core network control node for a plurality of home base stations that are communicatively connected to the gateway.

8. The method of claim 1, further comprising:
receiving, at the gateway, an X2AP HANDOVER REQUEST ACKNOWLEDGE message transmitted from the target network node;
transmitting, from the gateway, an S1AP HANDOVER COMMAND message to the source network node in response to receiving the X2AP HANDOVER REQUEST ACKNOWLEDGE message;
receiving, at the gateway, an X2AP UE CONTEXT RELEASE message transmitted from the target network node;
transmitting, from the gateway to the source network node, an S1AP UE CONTEXT RELEASE COMMAND message in response to receiving the X2AP UE CONTEXT RELEASE message and
receiving, at the gateway, an S1AP UE CONTEXT RELEASE COMPLETE message transmitted from the source network node.

9. The method of claim 1, wherein the gateway is a home base station concentrator node that provides a gateway service to multiple home base stations and that is configured to communicate with a Mobility Management Entity (MME) using an S1 interface.

10. The method of claim 1, wherein the receiving, the generating, and the transmitting are performed at the gateway without involving the core network control node.

11. The method of claim 1,
wherein the generating the second handover message occurs in response to receiving the first handover message, and in response to determining that the gateway is able to transmit the second handover message to the target network node.

12. A method for handing-over a connection from a source network node to a target network node, the method comprising:
receiving, at a gateway, a first handover message transmitted from the source network node, the first handover message indicating that a user equipment (UE) connection, serviced by the source network node, should be handed over to the target network node;
generating, at the gateway, a second handover message in response to receiving the first handover message; and
transmitting, from the gateway to the target network node, the second handover message,
wherein the gateway is a concentrator node that is distinct from and acts as a proxy of a core network control node for a plurality of base stations that are communicatively connected to the gateway,
wherein the first handover message is specified by a first protocol,
wherein the second handover message is specified by a second protocol that is different than the first protocol, and
wherein the first protocol is the X2AP protocol, the first handover message is an X2AP HANDOVER REQUEST message, the second protocol is the S1AP protocol, and the second handover message is a S1AP HANDOVER REQUEST message.

13. The method of claim 12, further comprising:
receiving, at the gateway, an S1AP HANDOVER REQUEST ACKNOWLEDGE message transmitted from the target network node;
generating, at the gateway, an X2AP HANDOVER REQUEST ACKNOWLEDGE message in response to receiving the S1AP HANDOVER REQUEST ACKNOWLEDGE message;
transmitting, from the gateway to the source network node, the X2AP HANDOVER REQUEST ACKNOWLEDGE message;
receiving, at the gateway, an S1AP HANDOVER NOTIFY message transmitted from the target network node;
generating, at the gateway, an S1AP PATH SWITCH REQUEST message in response to receiving the S1AP HANDOVER NOTIFY message;
transmitting, from the gateway, the S1AP PATH SWITCH REQUEST message to a core network node;
generating, at the gateway, an X2AP UE CONTEXT RELEASE message after receiving the S1AP HANDOVER NOTIFY message; and
transmitting, from the gateway, to the source network node the X2AP UE CONTEXT RELEASE message.

14. A method for handing-over a connection from a source network node to a target network node, the method comprising:
receiving, at a gateway, a first handover message transmitted from the source network node, the first handover message indicating that a user equipment (UE) connection, serviced by the source network node, should be handed over to the target network node;
generating, at the gateway, a second handover message in response to receiving the first handover message;
transmitting, from the gateway to the target network node, the second handover message,
receiving, at the gateway, a third handover message transmitted from a second source network node, the third handover message indicating that a UE serviced by the second source network node should be handed over to a second target network node;
when the gateway cannot communicate with the second target node, forwarding the third handover message to a core network node; and
when the gateway can communicate with the second target node, generating, at the gateway, a fourth handover message and transmitting, from the gateway to the second target network node, the fourth handover message,
wherein the gateway is a concentrator node that is distinct from and acts as a proxy of a core network control node for a plurality of base stations that are communicatively connected to the gateway.

15. A gateway apparatus for facilitating handover of a connection from a source network node to a target network node, comprising:
a data storage system configured to store computer software;
a data processing system configured to execute the computer software; and
a transmit and receive module configured to receive messages transmitted from the source network node including a first handover message that indicates that a user equipment (UE) connection, serviced by the source network node, should be handed over to the target network node and configured to transmit messages,
wherein the computer software is configured such that, when the computer software is executed by the data processing system, the data processing system, in response to receiving the first handover message, uses the transmit and receive module to transmit to the target network node a second handover message that was generated by the processing system, and
wherein the computer software is further configured such that, when the computer software is executed by the data processing system, the data processing system is operable to function distinct from and as a proxy of a core network control node for a plurality of home base stations that are communicatively connected to the gateway apparatus,
wherein the first handover message is specified by a first protocol, and the second handover message is specified by a second protocol that is different than the first protocol, and
wherein the first protocol specifies that the first handover message should transmitted to the core network control node, and
wherein the second protocol specifies that the second handover message should be transmitted from a base station.

16. The gateway apparatus of claim 15, wherein the source network node is a home base station and the target network node is a macro base station.

17. The gateway apparatus of claim 16, wherein the first protocol is the S1AP protocol, the first handover message is a S1AP HANDOVER REQUIRED message, the second protocol is the X2AP protocol, and the second handover message is an X2AP HANDOVER REQUEST message.

18. The gateway apparatus of claim 17, wherein the computer software is further configured such that, when the computer software is executed by the data processing system, the data processing system:
uses the transmit and receive module to transmit an S1AP HANDOVER COMMAND message to the source network node in response to receiving an X2AP HANDOVER REQUEST ACKNOWLEDGE message transmitted from the target network node;

uses the transmit and receive module to transmit to the source network node an S1AP UE CONTEXT RELEASE COMMAND message in response to receiving an X2AP UE CONTEXT RELEASE message transmitted from the target network node.

19. The gateway apparatus of claim 15, wherein the source network node is a macro base station and the target network node is a home base station.

20. The gateway apparatus of claim 19, wherein the first protocol is the X2AP protocol, the first handover message is an X2AP HANDOVER REQUEST message, the second protocol is the S1AP protocol, and the second handover message is a S1AP HANDOVER REQUEST message.

21. The gateway apparatus of claim 19, wherein
the first protocol specifies that the first handover message should be received and processed by a base station, and
the second protocol specifies that the second handover message should be generated by a core network control node and transmitted from the core network control node to the target network node.

22. The gateway apparatus of claim 15, wherein the gateway is a home base station concentrator node that provides a gateway service to multiple home base stations and that is configured to communicate with a Mobility Management Entity (MME) using an S1 interface.

23. The gateway apparatus of claim 15, wherein the computer software is configured such that when the computer software is executed by the data processing system the data processing system generates the second handover message by:

extracting certain information from the first handover message and including the extracted information in the second handover message;

retrieving previously stored information that was included in a control message received at the gateway, wherein the control message relates to a connection established with the UE, and including the retrieved previously stored information in the second handover message;

mapping information included in the first handover message to information required to be included in the second handover message;

including one or more predefined default values in the second handover message; and/or retrieving previously allocated information and including said retrieved previously allocated information in the second handover message.

24. The gateway apparatus of claim 15, wherein the computer software is configured such that, when the computer software is executed by the data processing system, the data processing system, in response to receiving the first handover message, uses a transmit and receive module to forward to a core network control node the first handover message when the processing system is not capable of communicating with the target network node.

25. The gateway apparatus of claim 15, wherein the computer software is configured such that, when the computer software is executed by the data processing system, the data processing system, in response to receiving the first handover message, generates the second handover message and uses the transmit and receive module to transmit the second handover message to the target network node without involving the core network control node.

* * * * *